United States Patent [19]
Kuroyanagi et al.

[11] Patent Number: 4,802,562
[45] Date of Patent: Feb. 7, 1989

[54] ELECTRONICALLY CONTROLLED BRAKING SYSTEM WITHOUT A MASTER CYLINDER

[75] Inventors: Masatoshi Kuroyanagi, Kariya; Kazuma Matsui, Toyohashi; Youzou Majima; Fumiaki Murakami, both of Kariya, all of Japan

[73] Assignee: Nippondenso Co., Ltd., Kariya, Japan

[21] Appl. No.: 25,841

[22] Filed: Mar. 13, 1987

[30] Foreign Application Priority Data

Mar. 17, 1986 [JP] Japan .................. 61-58990
May 2, 1986 [JP] Japan ................. 61-102742

[51] Int. Cl.⁴ .................. B60K 41/20; B60T 8/62; B60T 11/00
[52] U.S. Cl. .................. 192/1.23; 192/1.33; 192/1.34; 192/1.39; 303/20; 180/197; 364/426.01
[58] Field of Search .......... 303/20, 95, 100, 103; 180/197; 60/545, 591, 593; 91/460; 364/426; 192/1.23, 1.32, 1.34, 1.39, 1.33

[56] References Cited

U.S. PATENT DOCUMENTS

| | | | |
|---|---|---|---|
| 3,286,734 | 11/1966 | Hartshorne | 303/69 |
| 3,776,605 | 12/1973 | Ruof | 303/20 |
| 3,802,745 | 4/1974 | Strifler et al. | 303/20 |
| 4,484,280 | 11/1984 | Brugger et al. | 361/238 |
| 4,578,951 | 4/1986 | Belart et al. | 60/591 |

FOREIGN PATENT DOCUMENTS 59-171745 9/1984 Japan.

Primary Examiner—Rodney H. Bonck
Assistant Examiner—David A. Testardi
Attorney, Agent, or Firm—Cushman, Darby & Cushman

[57] ABSTRACT

The braking system comprising an input mechanism, such as a brake pedal or a brake lever, actuated by a vehicle operator during brake application. A sensor senses the pressure exerted on the brake pedal and delivers a first electrical signal in accordance with that pressure. The system also includes a source of brake fluid under a constant fluid pressure and pressure modulators in fluid communication with the source and the wheel cylinders. An electronic control unit responds to the first signal and delivers to the pressure modulators a second electrical signal proportional to the first signal to cause the pressure modulators to communicate to the wheel cylinders a fluid pressure proportional to the second signal to apply the brake with a braking force proportional to the applied pressure. The braking system also provides an anti-skid function, traction control function, and braking force proportioning function.

16 Claims, 12 Drawing Sheets

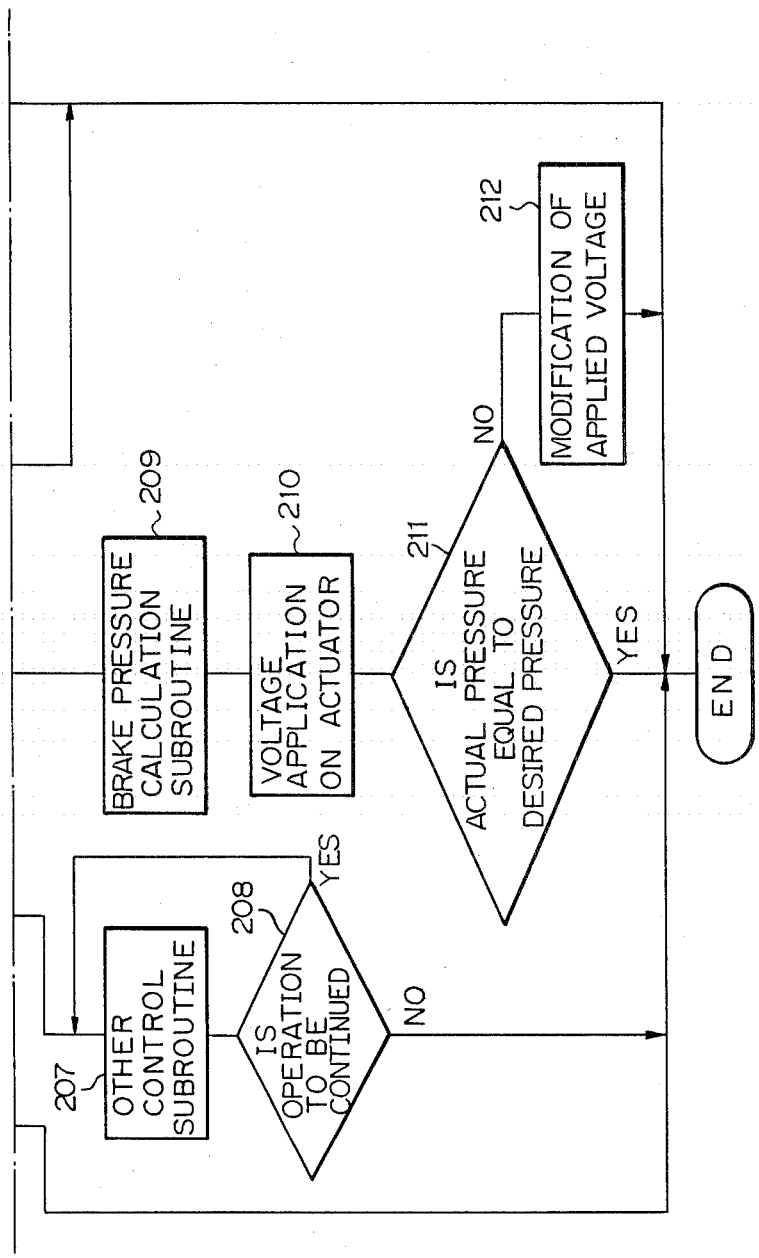

ELECTRONICALLY CONTROLLED BRAKING SYSTEM WITHOUT A MASTER CYLINDER

BACKGROUND OF THE INVENTION

1. Field of the Invention

This invention generally relates to an electronically controlled hydraulic braking system for a vehicle and, more particularly, to a braking system which is operable without a conventional master cylinder.

2. Description of the Related Art

Conventional hydraulic braking systems generally include a master cylinder operated in response to a pressure exerted on a brake pedal by a vehicle operator to generate a fluid pressure which is communicated to wheel cylinders to apply the brakes. In most braking systems, the pressure exerted by the operator is assisted by a brake booster such as a vacuum booster. For example, Japanese Unexamined Patent Publication No. 59-171745 discloses a hydraulic braking system having a master cylinder boosted by a vacuum booster. During anti-skid operation of the braking system, the fluid pressure communicated to the wheel cylinders is controlled by various solenoid-operated valves which, in turn, are controlled by an electronic control unit.

The use of a master cylinder has necessarily required relatively long hydraulic pressure lines to be provided between the master cylinder and the wheel cylinders, because the master cylinder is located far from wheel cylinders. This has been a bar to an improvement of the responsiveness of the braking system. Also, the provision for a brake booster has been an obstacle to the designing of a compact braking system. The use of various solenoid-operated valves for anti-skid and traction control operations has also complicated the design and installation of the system.

SUMMARY OF THE INVENTION

The primary object of the present invention is to provide an electronically controlled hydraulic braking system wherein a source for a brake fluid under pressure may be placed close to the wheel cylinders to reduce the length of the pressure lines and thus improve the responsiveness of the system.

Another object of the invention is to provide a braking system having a simple structure and easy to install.

A further object of the invention is to provide a braking system capable of providing a sufficient braking force without a brake booster.

Still another object of the invention is to provide a braking system which is capable of providing anti-skid and traction control operations, in addition to a normal braking operation.

A potential frictional force available between a wheel and a road surface varies in accordance with vehicle and road surface conditions. For example, when a vehicle is turning, the inner wheels are subjected to less load than the outer wheels, so that the inner wheels tend to lock, to cause wheel skidding, if the same level of fluid pressure is applied equally to the wheel cylinders of the inner and outer wheels.

Therefore, another object of the invention is to provide a braking system wherein fluid pressure communicated to different wheel cylinders may be varied in accordance with vehicle and road conditions to develop different levels of braking force proportional to the potential frictional forces available between the road surface and different wheels.

According to one aspect of the present invention, there is provided an electronically controlled braking system comprising an input mechanism, such as a brake pedal or a brake lever, actuated by a vehicle operator during brake application. A sensor, such as a pressure sensor, senses the pressure on the brake pedal and delivers a first electrical signal in accordance with that pressure. The system also includes a source of brake fluid under a constant fluid pressure, such as an accumulator fed with a high pressure fluid by a hydraulic pump. The braking system further comprises an electronic control unit responsive to the first electrical signal to deliver a second electrical signal proportional to the first electrical signal, and a pressure modulator in fluid communication with the source and the wheel cylinder and controlled by the control unit. The pressure modulator responds to the second signal to communicate a fluid pressure proportional to the second signal to the wheel cylinder to apply the brake with a braking force proportional to the pressure on the brake pedal.

With this arrangement, the braking system operates without a conventional master cylinder, which is normally placed in the vicinity of the operator far away from the wheel cylinders, and thus it is possible to locate the accumulator and the pressure modulator close to the wheel cylinders, thereby reducing the length of the pressure lines. This considerably enhances the responsiveness of the braking system. Further, since a high pressure fluid is constantly stored in the accumulator, and because the pressure modulator almost instantaneously communicates this pressure to the wheel cylinder to apply the brake upon receipt of the second electrical signal which, in turn, is delivered upon actuation of the brake pedal, the brake is applied much more promptly than in the conventional braking system wherein the fluid pressure must be first generated by the operator's actuation of a master cylinder and then transmitted through long pressure lines to the wheel cylinders. Another advantage is that the accumulator may store a brake fluid under a high pressure so that there is no need for the braking system to be provided with a brake booster.

According to another aspect of the invention, the hydraulic pump is driven by an electric motor and the braking system also includes a switch sensor for sensing the position of an ignition switch of the vehicle and a pressure sensor for sensing the fluid pressure at the accumulator. The control unit energizes the pump motor when the ignition switch is closed and whenever the fluid pressure at the accumulator is less than a predetermined level. This arrangement enables a saving in power consumption.

According to a further aspect of the invention, the braking system is also provided with a wheel sensor for detecting the rotation of the wheel. The control unit cooperates with the wheel sensor and causes the pressure modulator to communicate a fluid pressure to the wheel cylinder whenever the control unit detects a rotation of the wheel when the ignition switch is turned OFF. This improves security for the vehicle and prevents inadvertent movement of the vehicle after parking.

According to another aspect, this invention provides a braking system having anti-skid and traction control functions. The braking system according to the invention also provides a braking force proportioning function wherein the fluid pressure at the wheel cylinders is adjusted so that the braking force developed by respective brakes is proportional to the potential frictional force available between each wheel and the road surface.

BRIEF DESCRIPTION OF THE DRAWINGS

FIG. 5 which comprises FIGS. 5A and 5B, is a flow diagram showing the operation of the electronic control unit;

DESCRIPTION OF THE PREFERRED EMBODIMENTS

Figure 1:
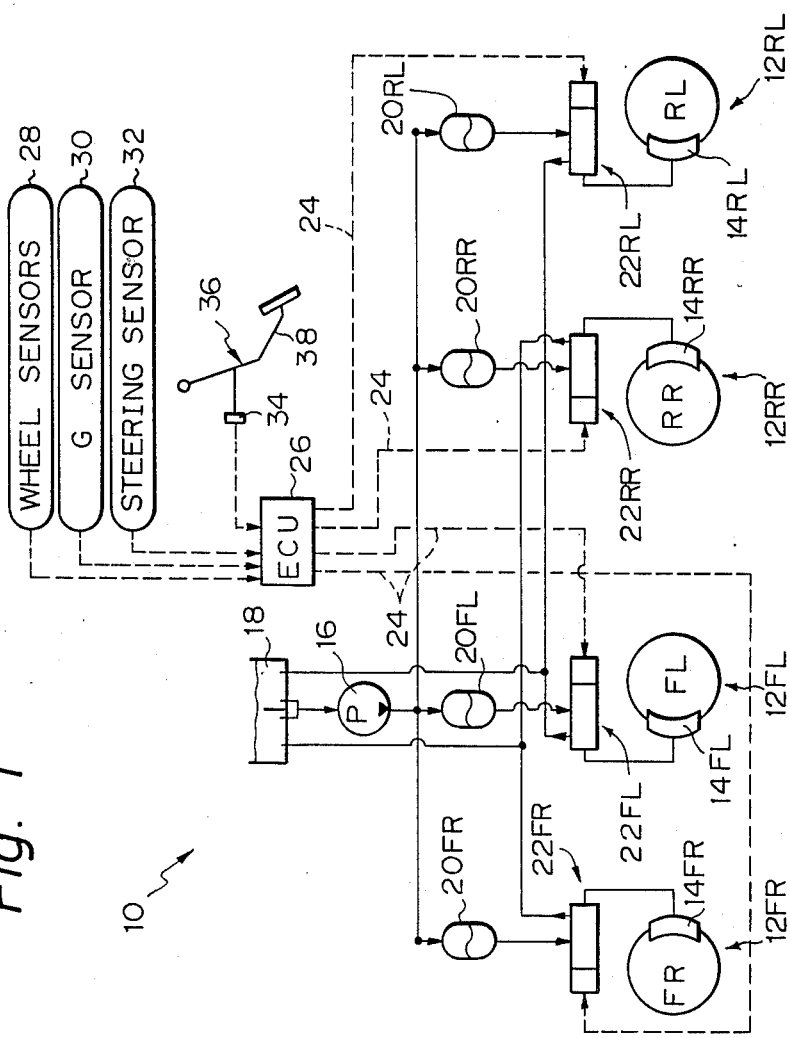
FIG. 1 is a diagrammatic view showing the layout of the braking system according to the first embodiment of the invention.
Figure 2:
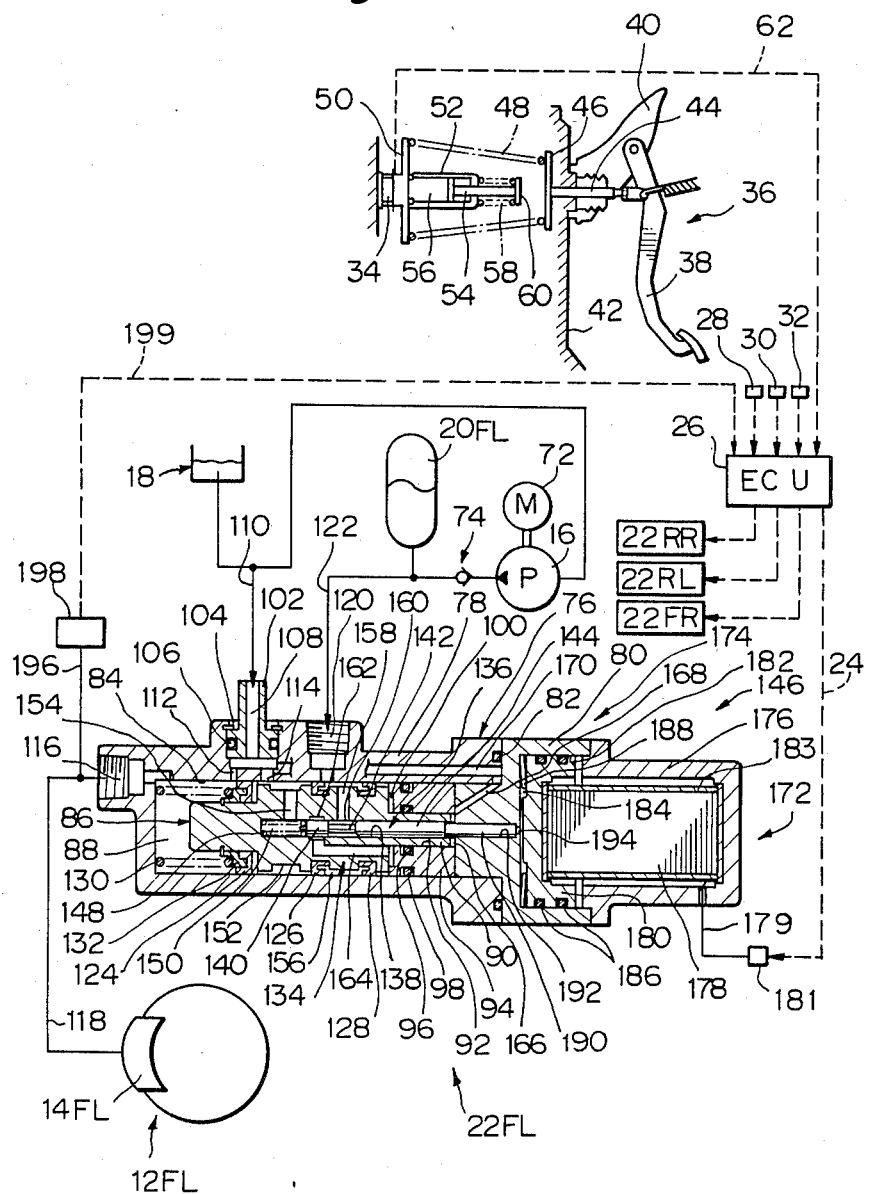
FIG. 2 is a view, partly in cross section, of the braking system of FIG. 1, with the pressure modulator and the input means of FIG. 1 shown in greater detail.

Referring to the drawings, FIG. 1 illustrates diagrammatically the general layout of the braking system according to the first embodiment of the invention. The braking system 10 includes a brake 12FR for the front right wheel, a brake 12FL for the front left wheel, a brake 12RR for the rear right wheel, and a brake 12RL for the rear left wheel. These brakes include conventional wheel cylinders which are symbolically shown at 14FR, 14FL, 14RR, and 14RL. A hydraulic pump 16 draws in a brake fluid stored in a reservoir 18 and pumps the fluid to conventional accumulators 20FR, 20FL, 20RR, and 20RL, which are designed to store the brake fluid under a constant high pressure. The fluid pressure at the respective accumulators is independently adjusted by pressure modulators 22FR, 22FL, 22RR, and 22RL and is communicated to the respective wheel cylinders to apply the brakes with an equal or different braking force, as described later. The pressure modulators, which will be described later in greater detail with reference to FIG. 2, are electrically controlled through signal lines 24 by an electronic control unit (ECU) 26. A programmable electronic circuitry which may be used as the ECU 26 for the purpose of the present invention is commercially available under Part No. 89541-14010 from Toyota Buhin Aichi Kyohan K.K., of 3-41, Takamatsu-cho, Kariya-shi, Aichi, Japan. The ECU 26 receives signals from conventional wheel sensors 28 associated with the respective wheels, to detect the rotational speed of the wheels, from a conventional G sensor 30 designed to detect acceleration and deceleration of the vehicle, and from a conventional steering sensor 32 adapted to sense the steering angle of the steering wheels. The ECU 26 also receives a signal from a sensing means, such as a pressure sensor 34, which senses the amount of actuation by the vehicle operator of an input means 36, such as a foot operated brake pedal 38 or a hand operated brake lever (not shown). The ECU 26 delivers a control signal over lines 24 to the respective pressure modulators 22 to modulate the fluid pressure communicated to the respective wheel cylinders 14.

FIG. 2 shows, in greater detail, the input means 36 with associated pressure sensor 34, and the pressure modulator 22FL for the front left wheel cylinder 14FL. The pressure modulators 22FR, 22RR, and 22RL for the front right, rear right, and rear left wheel cylinders 14FR, 14RR, and 14RL are identical in structure to the front left pressure modulator 22FL and, therefore, will not be described.

In the embodiment shown in FIG. 2, the brake pedal 38 forming part of the input means 36 is pivoted at a bracket 40 secured to a wall 42 of the vehicle body and is linked through a rod 44 to a circular plate 46 which is in resilient contact with an outer end of a coil spring 48. The inner end of the spring 48 engages with and urges a pressure plate 50 into pressure contact with the pressure sensor 34. A cylinder member 52 having a piston 54 defining an oil filled chamber 56 is aligned with the brake rod 44 and is secured to the pressure plate 50. The piston 54 is urged to the right as viewed in FIG. 2 by a compression spring 58 held between the cylinder 52 and a spring retainer 60.

Upon actuation of the brake pedal 38, the pressure exerted is transmitted through the rod 44, the plate 46, and the coil spring 48 to the pressure plate 50 to compress the pressure sensor 34, which delivers via a line 62 a variable voltage signal proportional to the exerted pressure to the ECU 26.

As more pressure is exerted on the brake pedal 38, the plate 46 is brought into contact with the spring retainer 60 to move the piston 54 to the left, thereby pressurizing the oil in the chamber 56. This precludes further movement of the brake pedal, to increase a reaction on the pedal and thereby provide the operator with a normal braking feeling encountered with a conventional brake pedal.

Figure 3:
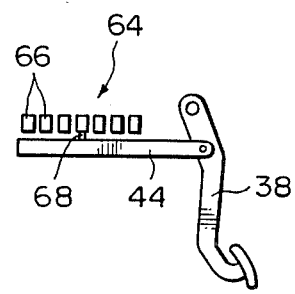
FIG. 3 is a schematic representation showing another version of the sensing means shown in FIG. 1.
Figure 4:
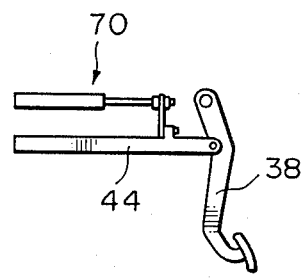
FIG. 4 is a schematic view of a further version of the sensing means.

Alternatively, the sensing means 34 for sensing the amount of actuation on the input means 36 may comprise a photointerrupter 64, as shown in FIG. 3, having a series of photocells 66 which are connected to the ECU 26 and having optical paths which are designed to be interrupted by a movable member 68 integral with the brake rod 44. Similarly, as shown in FIG. 4, the sensing means 34 may comprise a potentiometer 70 associated with the brake rod 44.

Returning to FIG. 2, the pump 16 is driven by an electric motor 72. The pump 16 draws the brake fluid from the reservoir 18 and pumps the fluid through a check valve 74 to the accumulators, including the accumulator 20FL for the front left wheel cylinder 14FL.

The pressure modulator 22FL includes a housing 76 having a housing main body or cylinder 78 and a rear housing portion 80. These members 78 and 80 are held together by suitable fastening means such as screws, not shown, and are sealed fluid-tight by an O-ring 82. The cylinder 78 has a cylinder bore 84 in which a piston 86 is slidably received to define an output chamber 88. The piston 86 has a small diameter portion 90 which slidably extends into a central bore 92 in a stationary member 94 seated on the rear portion 80. O-rings 96 and 98 are provided to effect sealing between the piston portion 90 and the stationary member 94 and between the member 94 and the cylinder 78, respectively. In the rest position of the piston 86 as shown, the piston 86 cooperates with the stationary member 94 to define an annular input chamber 100 therebetween.

A fitting 102 is mounted to the cylinder 78 and is retained by a circlip 104. An O-ring 106 is used to seal the fitting 102 against the cylinder 78. The fitting 102 defines a low pressure port 108 which is in fluid communication with the reservoir 18 via a conduit 110. When the piston 86 is in the rest position, the low pressure port 108 is communicated with the output chamber 88 through a port 112 in the cylinder 78, to allow the brake fluid in the reservoir 18 to flow into the output chamber 88 whenever the piston 86 is returned to the initial position. The low pressure port 108 is also connected to a pressure relief port 114 opening into the cylinder bore 84 and inwardly spaced from the port 112.

The housing 76 has an outlet port 116 communicated with the output chamber 88 on the one hand, and communicated via a pressure line 118 with the wheel cylinder 14FL on the other hand. The housing 76 is also provided with an inlet port 120 communicated via a supply line 122 with a accumulator 20FL and opening into the cylinder bore 84.

The piston 86 has elastomeric movable sealing members 124, 126, and 128 mounted around the outer periphery thereof and axially spaced from each other. The piston 86 is biased toward the stationary member 94 by a coil spring 130 disposed in the output chamber 88 and received at an end by a spring seat 132 abutting against the first sealing member 124. The first sealing member 124 is so positioned that, in the rest position of the piston 86 as shown, the member 124 is located between the ports 112 and 114.

The piston 86 is provided with a built-in valve mechanism 134 for controlling the fluid communication between the inlet port 120 and the input chamber 100. This valve mechanism 134 includes a spool valve member 136 movably and closely fitted within a central bore 138 in the piston 86. The spool valve member 136 is comprised of a first land 140, a reduced diameter section 142, and an elongated second land 144. The axial position of the spool valve member 136 relative to the housing 76 is controlled by an electrically operated positioning means 146 described later. In FIG. 2, the valve member 136 is shown as being positioned in its initial or most retracted position. The valve member 136 is urged toward this position by a coil spring 148 received in a spring chamber 150 defined by the bore 138.

The piston 86 has at the outer periphery thereof an annular recess 152 located between the first and second sealing members 124 and 126. The annular recess 152 is in fluid communication with the spring chamber 150 through a radial passage 154 in the piston 86. The width of the recess 152 and the positions of the first and second sealing members 124 and 126 are so selected that the pressure relief port 114 is in permanent fluid communication with the radial passage 154 for all axial positions of the piston 86.

An annular space 156 formed between the second and third sealing members 126 and 128 is communicated, via a radial passage 158 in the piston 86, with an annular space 160 formed around the reduced diameter section 142 of the valve member 136. The second and third sealing members 126 and 128 are positioned such that the inlet port 120 is in constant fluid communication with the radial passage 158 for all positions of the piston 86.

The piston 86 is also provided with an annular recess 162 opening into the central bore 138. The size and position of this recess 162 are such that the recess 162 mates with and is closed by the first spool land 140 of the valve member 136 when both the piston 86 and the valve member 136 are in the rest position as shown.

A passage 164 in the piston 86 communicates this annular recess 162 to the input chamber 100.

The axial length of the small diameter portion 90 of the piston 86 is slightly smaller than that of the stationary member 94, so that a balancing chamber 166 is formed between the portion 90 and the rear housing section 80. This chamber 166 is communicated to the low pressure port 108 through a passage 168 in the rear housing section 80 and through a passage 170 in the cylinder 78.

The axial position of the spool valve member 136 with respect to the housing 76 is controlled by the positioning means 146 which, in the illustrated embodiment, comprises a piezoelectric actuator 172 and a hydromechanical amplifier 174. The piezoelectric actuator 172 is a conventional type and is adapted to axially expand and contract in response to a voltage signal received from the ECU 26. The hydromechanical amplifier 174 amplifies the movement of the piezoelectric actuator 172 and displaces the spool valve member 136 through an amount of travel which is a predetermined multiple of the amount of expansion and contraction of the piezoelectric acutator 172.

More specifically, the piezoelectric actuator 172 includes a cup-shaped casing 176 rigidly secured to the rear housing section 80. The acutator 172 also includes a stack 178 of piezoelectric ceramic disks with plus and minus foil electrodes alternately interleaved between the disks, as well known in the art. The piezoelectric stack 178 may be arranged, for example, to expand upon application of a plus voltage on the plus electrodes. In that case, the plus electrodes may be connected to a plus lead 179 leading to a connector 181 to which the signal line 24 from the ECU 26 is connected. The minus electrodes may be grounded. The piezoelectric stack 178 is sandwiched between a pair of insulating plates and is enclosed by an insulating sleeve 183.

The hydromechanical amplifier 174 includes a piston 180 slidably received in a cylinder bore 182 in the rear housing section 80 to define a pumping or variable volume chamber 184. The piston 180 is slidably sealed against the cylinder bore 182 by a pair of O-rings 186. A Belleville spring 188 is received in the pumping chamber 184 to urge the piston 180 into pressure contact with the piezoelectric stack 178 and to impart a predetermined preload on the stack 178. The amplifier 174 also includes a plunger 190 slidably and closely fitted within a central bore 192 which is formed in the rear housing section 80, and which is in fluid communication with the variable volume chamber 184 via an orifice 194 in the section 80, to transmit the fluid pressure in the chamber 184 to the plunger 190. The diameter of the plunger 190 is a predetermined fraction of that of the piston 180 so that a movement of the piston 180 through a certain amount of travel will cause a plunger displacement of a predetermined multiple of the piston travel. In the illustrated embodiment, the plunger 190 is made separate from the spool valve member 136. This is advantageous in that any possible misalignment between the plunger 190 and the spool valve member 136 is thus accommodated. However, the plunger 190 may be made integral with the valve member 136.

A pressure conduit 196 is branched from the pressure line 118 leading to the wheel cylinder 14FL and is connected to a fluid pressure sensor 198 which is designed to sense a pressure at the wheel cylinder and deliver a signal via a signal line 199 to the ECU 26.

The operation of the pressure modulator 22FL is as follows.

When the brake pedal 38 is not actuated, the piston 86 and the spool valve member 136 of the pressure modulator 22FL assume the position shown in FIG. 2. The output chamber 88 is in fluid communication with the reservoir 18 via the port 112, the low pressure port 108, and the conduit 110. Thus, the pressure at the outlet port 116, and hence at the wheel cylinder 14FL, is held at the reservoir pressure which is equal to the atmospheric pressure.

The first spool land 140 of the spool valve member 136 is held in registration with the annular recess 162 to interrupt fluid communication between the passages 158 and 164 and between the passage 154 and 164, so that the input chamber 100 is isolated from both the inlet port 120 and the low pressure port 108. The fluid pressure at the spring chamber 150 and the balancing chamber 166 is equal to the atmospheric pressure.

When pressure is exerted on the brake pedal 38, the pressure sensor 34 senses that pressure and delivers a signal proportional to the pressure to the ECU 26, whereupon the ECU 26 issues a control signal via the line 24 to the piezoelectric actuator 172 causing the piezoelectric stack 178 to expand. This causes the piston 180 to move to the left to reduce the volume of the variable volume chamber 184, whereby the fluid is displaced therefrom into the orifice 194 to move the plunger 190 to the left as viewed in FIG. 2, causing the spool valve member 136 to move against the action of the spring 148.

As a result, the first spool land section 140 of the valve member 136 is offset from the annular recess 162 to open communication between the passages 158 and 164, thereby allowing the brake fluid under pressure at the inlet port 120 to flow into the input chamber 100. This causes the piston 86 to move to the left under the pressure difference between the input and output chambers 100 and 88, whereupon the port 112 is closed by the first sealing member 124 to interrupt fluid communication between the output chamber 88 and the reservoir 18. As the piston 86 moves further, the fluid in the output chamber 88 is pressurized and is fed through the outlet port 116 and the pressure line 118 to the wheel cylinder 14FL to apply the brake.

The leftward movement of the piston 86 will result in a change in the relative position of the annular recess 162 with respect to the first spool land 140. Thus, as the piston 86 moves further to the left, the first land 140 is offset to the right from the annular recess 162, thereby interrupting fluid communication between the inlet port 120 and the input chamber 100 but opening communication between the input chamber 100 and the pressure relief port 114. This causes a part of the fluid in the input chamber 100 to flow through the pressure relief port 114 and the low pressure port 108 into the reservoir 18, thereby reducing the fluid pressure in the input chamber 100 and allowing the piston 86 to move to the right to reduce the output chamber pressure transmitted to the wheel cylinder 14FL.

The leftward and rightward movements of the piston 86 are repeated until the pressure in the output chamber 88 is balanced with the pressure in the input chamber 100 for a given position of the spool valve member 136. In the balanced state, the fluid pressure communicated to the wheel cylinder will be proportional to the magnitude of the voltage signal applied by the ECU 26 to the piezoelectric actuator 172.

Figure 5A:
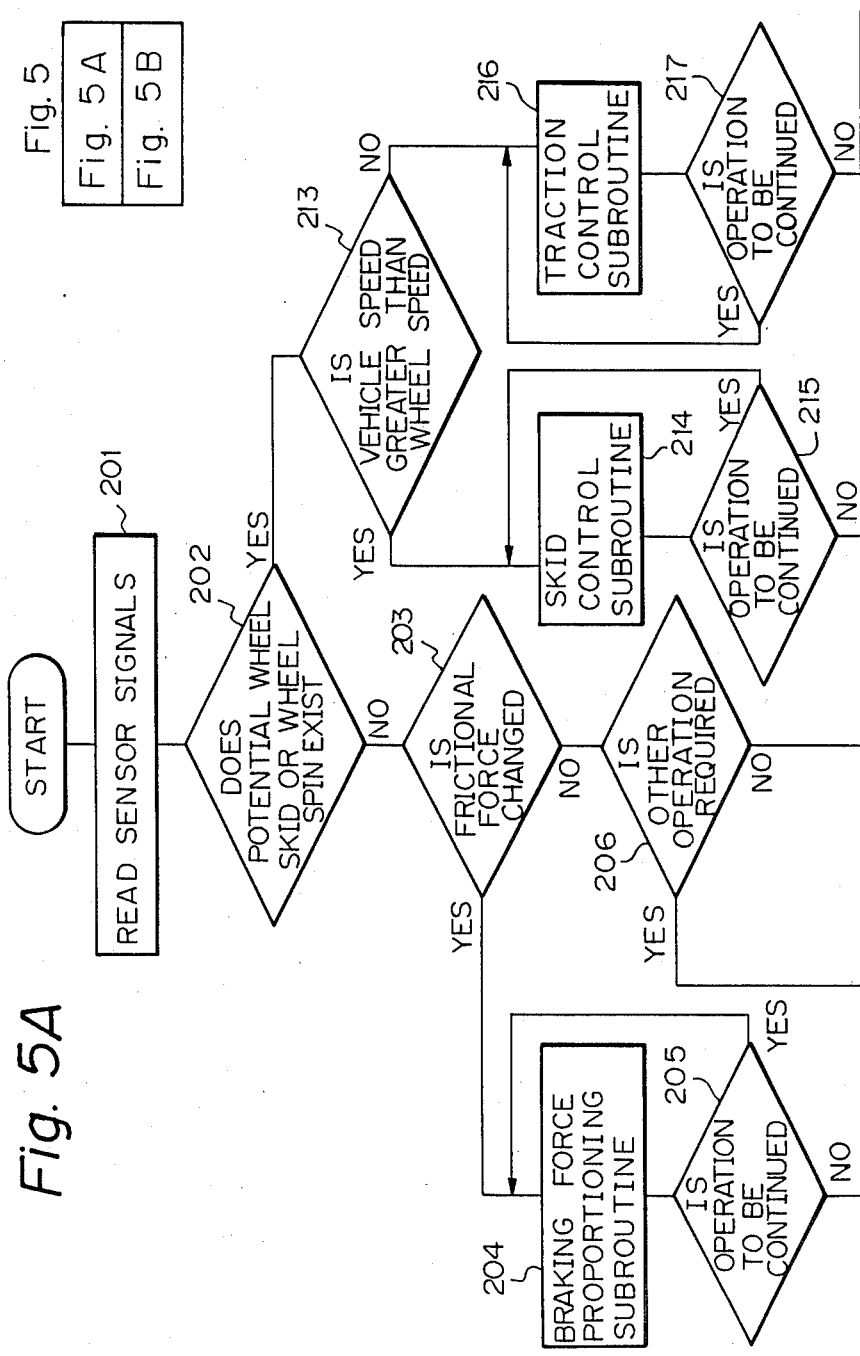

The operation of the braking system 10 will now be described with reference to the flow diagram of FIG. 5. The routine shown in the flow diagram is implemented by the ECU 26 which comprises a suitably programmed digital computer.

At function 201, the ECU 26 reads signals from various sensors such as the pressure sensor 34, the wheel sensors 28, the G sensor 30, the steering sensor 32, the fluid pressure sensors 198, and so on. At function 202, the ECU determines if a potential wheel skid or wheel spin condition exists. This determination may be made, for example, by calculating an imaginary vehicle speed based on the signals from the wheel sensors 28 and by comparing the result with an actual rotational speed of either of the wheels.

If a potential wheel skid or wheel spin condition does not exist, then at function 203, the ECU 26 determines whether there is any change in the potential frictional forces available between the wheels and the road surface due to, for example, a vehicle turn, based on the signals from the G sensor 30 and the steering sensor 32. If a change occurs, then the ECU goes to function 204 to perform a braking force proportioning subroutine wherein the pressure modulators 22 associated with the wheels subjected to an increasing frictional force are caused to deliver a higher wheel cylinder pressure than the pressure modulators associated with those wheels subjected to a reduced frictional force. At function 205, the ECU 26 determines if the braking force proportioning operation is to be continued and returns to function 204 to continue the braking force proportioning subroutine until the change in the potential frictional forces disappears.

If a change in potential frictional force is not sensed at function 203, then at function 206, a determination is made as to whether any other control operation is required. If so, at function 207, the ECU 26 performs a subroutine for the other control operation and repeats it at function 208 until the other operation becomes unnecessary. This other control may include applying the brakes of the inner wheels when the vehicle is turning at a relatively low speed. This will provide an oversteering effect which facilitates the operator's handling of the steering wheel. Alternatively, during a vehicle turn at a higher speed, the brakes of the outer wheels may be applied to provide an understeering effect which will improve the stability of the steering. Similarly, either of the brakes may be selectively applied to prevent yawing of the vehicle which may result due to a strong wind thrust.

In the absence of a requirement for another control operation, the braking system is operated under a normal braking mode. During the normal braking operation, the ECU 26 performs a brake pressure calculation subroutine at function 209, wherein calculation of a desired fluid pressure to be applied to the respective wheel cylinders 14 is based on and is proportional to the signal from the foot pressure sensor 34. Then at function 210, a voltage signal proportional to the desired fluid pressure is calculated and is applied via the control signal lines 24 to the respective piezoelectric actuators 172. At function 211, the ECU 26 senses the wheel cylinder pressure based on the signal from the fluid pressure sensor 198 and compares the actual fluid pressure with the desired pressure. If the actual pressure deviates from the desired pressure, then the ECU 26 modifies the voltage signal at function 212 to feed-back control the pressure communicated to the wheel cylinders. In this manner, during a normal braking operation, a fluid pressure proportional to the pressure applied to the brake pedal 38 is communicated to the wheel cylinders.

If, at function 202, the ECU 26 senses a wheel skid or wheel spin condition, then at function 213, the vehicle speed is compared with the rotational speed of the wheel. If the wheel speed is smaller than the vehicle speed, indicating that there is a potential wheel skid condition, then the ECU 26 performs a skid control subroutine 214 wherein the ECU delivers a reduced voltage signal to the piezoelectric actuators 172 of the pressure modulators 22 associated with the skidding wheels. In each of the piezoelectric actuators receiving the reduced voltage signal, the piezoelectric stack 178 is caused to contract, allowing the spool valve member 136 to move through a certain amount of travel to the right as viewed in FIG. 2. Thus, the first spool land 140 of the spool valve member 136 is offset to the right with respect to the annular recess 162, thereby opening fluid communication between the output chamber 100 and the pressure relief port 114 and thus allowing the piston 86 to move to the right until the fluid pressure in the output chamber 88 is balanced with the reduced fluid pressure in the input chamber 100 for a new position of the spool valve member 136, whereupon the fluid pressure communicated to the wheel cylinder 14 is reduced to restore the rotation of the skidding wheel and to eliminate the potential wheel skid condition. Alternatively, the fluid pressure communicated to the wheel cylinders may be adjusted in such a manner that the slip ratio of the skidding wheels is controlled within a predetermined range.

The skid control operation 214 is continued until, at function 215, it is indicated that the potential skid condition has been eliminated.

If at function 213 it is determined that the vehicle speed is less than the rotational speed of the driven wheels, indicating that there is a potential wheel spin condition, then a traction control subroutine is performed at function 216 wherein the ECU 26 issues a voltage signal to the piezoelectric actuators of the pressure modulators associated with the driven wheels to cause those pressure modulators to deliver an output pressure to apply the brakes and retard the rotation of the spinning wheels. Brake application is continued until an elimination of the potential wheel spin condition is sensed at function 217.

Figure 6:
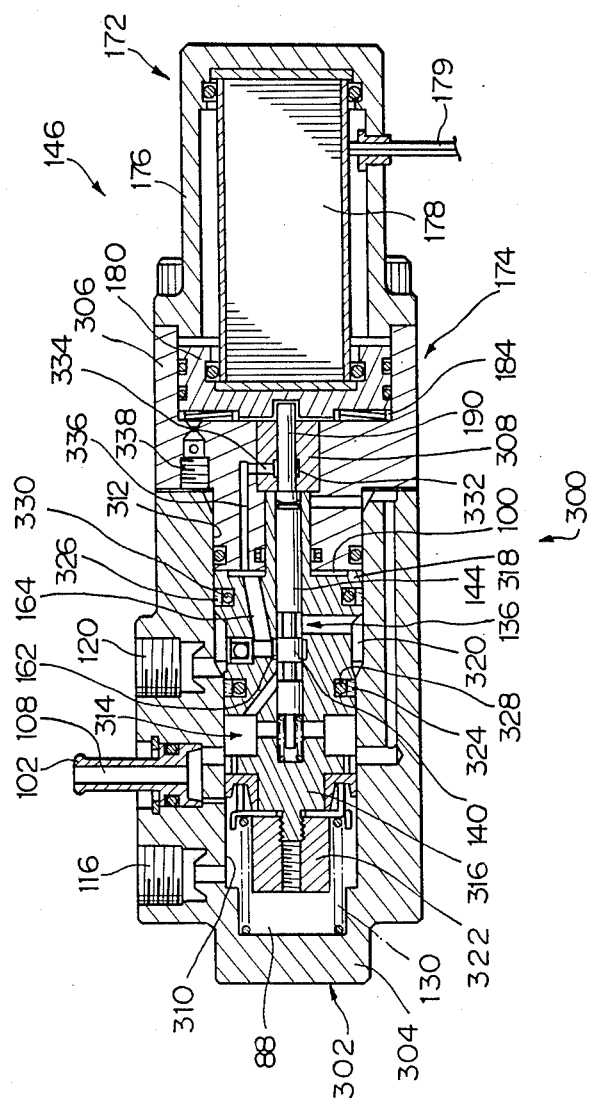
FIG. 6 is a cross-sectional view showing a modified version of the pressure modulator shown in FIG. 2.

FIG. 6 illustrates a modified version of the piezoelectric pressure modulator 22FL shown in FIG. 2. Parts and members equivalent to those shown in FIG. 2 are indicated by like reference numerals and thus a description thereof will be omitted. Only the differences will be described hereinbelow. The pressure modulator shown in FIG. 6 may be used in place of any of the pressure modulators 22FL, 22FR, 22RR, and 22RL of the braking system 10 shown in FIG. 1.

Referring to FIG. 6, the pressure modulator 300 includes a housing 302 comprised of a cylinder 304, a rear housing portion 306, and a stationary member 308. The cylinder 304 defines a stepped bore having a small diameter bore section 310 and a large diameter bore section 312. A stepped piston 314 having a small diameter portion 316 and a large diameter portion 318 is slidably received in the bore of the housing 302 and cooperates therewith to define the output chamber 88 communicated with the outlet port 116, the input chamber 100 communicated with the annular recess 162 via the passage 164, and an intermediate annular pressurizing chamber 320 communicated with the inlet port 120. The provision for this annular pressurizing chamber 320, which is constantly subjected to the high pressure fluid at the inlet port 120, enables a prompt return of the piston 314 to its initial position under a hydrostatic force, in addition to the bias by the spring 130, and improves the responsiveness of the pressure modulator 300.

A stop 322 is screwed over the small diameter portion 316 and serves to limit the maximum stroke of the piston 314.

Instead of the second and third elastomeric sealing members 126 and 128 shown in FIG. 2, the piston 314 is provided at its outer periphery with a pair of antifriction rings 324 and 326 made from polytetrafluoroethylene. Sealing between these rings and the piston 314 is effected by O-rings 328 and 330. This arrangement enables the friction between the piston 314 and the cylinder 304 to be reduced.

Another important difference is that the stationary member 308 is provided with an annular recess 332 which is communicated with the input chamber 100 through a passage 334 in the stationary member 308 and a passage 336 in the rear housing portion 306. It will be appreciated that when the piezoelectric actuator 172 is energized to shift the spool valve member 136 to the left, causing the high pressure fluid at the inlet port 120 to flow into the input chamber 100, the fluid pressure in the variable volume chamber 184 is increased. However, since the fluid pressure at the input chamber 100 is permitted to flow via the passages 336 and 334 into the annular recess 332 to correspondingly increase the fluid pressure at the recess 332, the pressure at the variable volume chamber 184 is counterbalanced with the pressure at the annular recess 332, thereby preventing the fluid in the variable volume chamber from leaking through a clearance between the plunger 190 and the stationary member 308. Thus, this arrangement enables a desired quantity of fluid to be maintained within the variable volume chamber 184. Any volume of air accumulated in the chamber 184 may be bled by releasing an air bleed valve 338.

Figure 7:
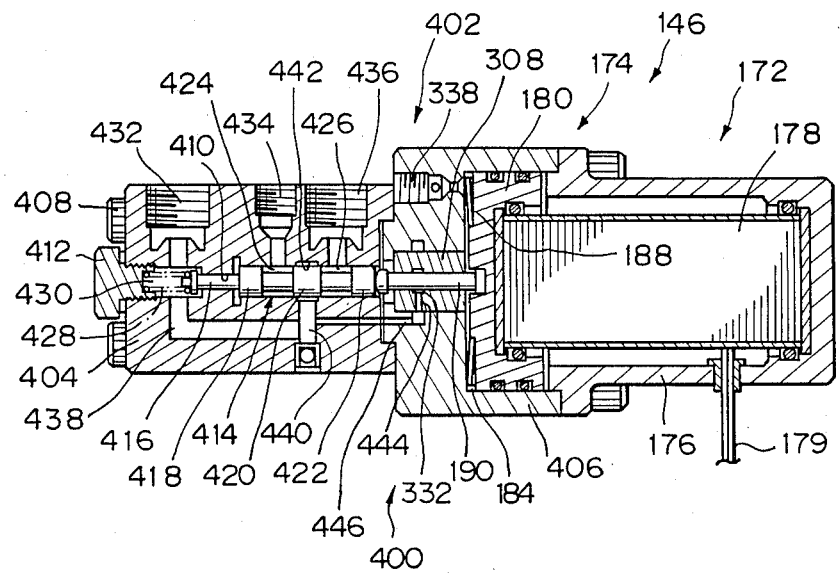
FIG. 7 is a cross-sectional view showing another version of the pressure modulator.

FIG. 7 illustrates another version of the piezoelectric pressure modulator usable in the braking system of the present invention. The pressure modulator 400 includes a housing 402 having a main body 404 and a rear housing portion 406 held together by a plurality of screws 408. The body 404 has a stepped central bore 410 therethrough closed at an end by a plug 412. The bore 410 receives a spool valve member 414 and a plunger 416 slidably and closely fitted therein. The spool valve member 414 has spaced first, second, and third spool lands 418, 420 and 422 defining spaced annular spaces 424 and 426. The plunger 416 is biased into contact with the spool valve member 414 by a spring 428 received in an output chamber 430. The body 404 has an outlet port 432 communicated with the output chamber 430, a pressure relief port 434 communicated with the annular space 424, and an inlet port 436 communicated with the annular space 426. The outlet port 432, the pressure relief port 434, and the inlet port 436 may be connected, respectively, to the wheel cylinder 14, the brake fluid reservoir 18, and the accumulator 20. Passages 438 and 440 communicate the output chamber 430 with an annular recess 442, which has a size and location such that it is registered with and closed by the second spool land 420 of the valve member 414 in the initial position of the valve member 414. A positioning means 146 substantially identical to that shown in FIG. 6, and including the piezoelectric actuator 172 and the hydromechanical amplifier 174, is also used to axially position the spool valve member 414 with respect to the housing 402. The annular recess 332 in the stationary member 308 is communicated with the output chamber 430 through passages 444 and 446 and the passages 440 and 438, to prevent fluid leakage from the variable volume chamber 184, as in the embodiment shown in FIG. 6.

The operation of the pressure modulator 400 is as follows.

During deenergization of the piezoelectric actuator 172, the fluid pressure in the variable volume chamber 184 is held equal to the wheel cylinder pressure which is substantially at atmospheric pressure. The piston 180 is biased by the Belleville spring 188 so that a predetermined preload is imparted on the piezoelectric stack 178.

Upon application of a voltage signal on the piezoelectric actuator 172, the piezoelectric stack 178 expands due to piezoelectric effect so that the spool valve member 414 is moved to the left as in the preceding embodiments, causing the second spool land 420 to be offset leftward relative to the annular recess 442, thereby opening fluid communication between the annular space 426 and the annular recess 442. This causes the high pressure fluid at the accumulator to flow through the inlet port 436, the annular space 426, the annular recess 442, the passages 440 and 438, the output chamber 430, and the outlet port 432 into the wheel cylinder to increase the fluid pressure therein.

As the pressure at the output chamber 430 rises, the plunger 416 is forced to the right under the action of the fluid pressure in the output chamber 430 and the action of the spring 428, causing the spool valve member 414 to move to the right and drive the plunger 190 into the variable volume chamber 184. This increases the fluid pressure in the chamber 184 so that the piston 180 is urged to the right, thereby subjecting the piezoelectric ceramic stack 178 to an increasing force. This causes a small amount of elastic deformation of the piezoelectric stack 178 and brings about a slight reduction in the axial length of the stack 178. It should be appreciated that this slight reduction in the axial length takes place due to mechanical stress imposed upon the piezoelectric ceramic stack 178, in contrast to the initial expansion of the stack caused by piezoelectric stress developed in the stack. This reduction in the axial length causes the piston 180 to move to the right, permitting the spool valve member 414 to move in the same direction, whereupon the second spool land 420 of the valve member 414 is then offset to the right with respect to the annular recess 442, thereby interrupting fluid communication between the inlet and outlet ports 436 and 432 and opening communication between the outlet and relief ports 432 and 434 to relieve the wheel cylinder pressure.

Thus, the pressure at the output chamber 430 is reduced so that the spool valve member 414 is then moved to the left to reestablish the fluid communication between the inlet and outlet ports 436 and 432.

The leftward and rightward movements of the spool valve member 414 are repeated until the leftward force acting on the plunger 190 due to the fluid pressure in the variable volume chamber 184 is balanced with the rightward force acting on the opposite plunger 416 due to the fluid pressure in the output chamber 430 and due to the spring bias. In the balanced condition, the second spool land 420 of the valve member 414 is brought into registration with the annular recess 442 and a fluid pressure proportional to the level of the applied voltage signal is communicated to the wheel cylinder. When the voltage level is varied, the spool valve member 414 is brought into the balanced position under an increased or reduced output chamber pressure. In this manner, similar to the preceding embodiments, the fluid pressure communicated from the pressure modulator 400 to the wheel cylinder may be adjusted by varying the level of the voltage signal applied to the piezoelectric actuator 172.

Figure 8:
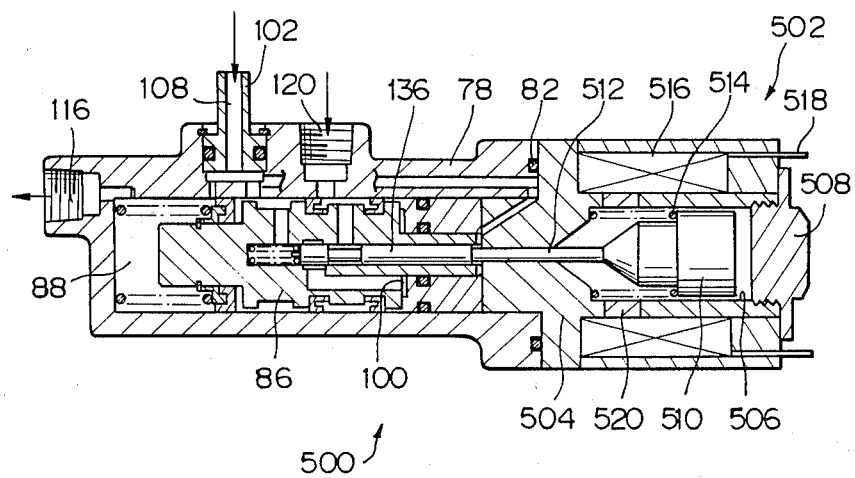
FIG. 8 is a cross-sectional view showing a further version of the pressure modulator.

FIG. 8 shows still another version of the pressure modulator. Parts and members equivalent to those of the embodiment shown in FIG. 2 are indicated by like reference numerals and therefore, are not described. The pressure modulator 500 differs from the modulator 22FL only in that the means for positioning the spool valve member 136 comprises a solenoid operated actuator 502. The modulator 500 includes a rear housing portion 504 made from a ferromagnetic material and having a bore 506 closed by a cap 508. An armature 510 having an integral rod 512 is movably received in the bore 506 and is biased by a coil spring 514 into contact with the cap 508. A solenoid winding 516 is provided and is adapted to be excited by the ECU 26 through lead wires 518. An annular ring 520 made from a nonmagnetic insulating material is inserted in the rear housing portion 504 inside of the winding 516. Upon supply of an electric power to the solenoid winding 516, the armature 510 is attracted to the left, causing the integral rod 512 to move and displace the spool valve member 136. The travel of the armature 510 may be varied by controlling the intensity of the electric power. Displacement of the spool valve member 136 causes movement of the piston 86, to deliver a fluid pressure to the wheel cylinder as described hereinbefore with reference to FIG. 2.

Figure 9:
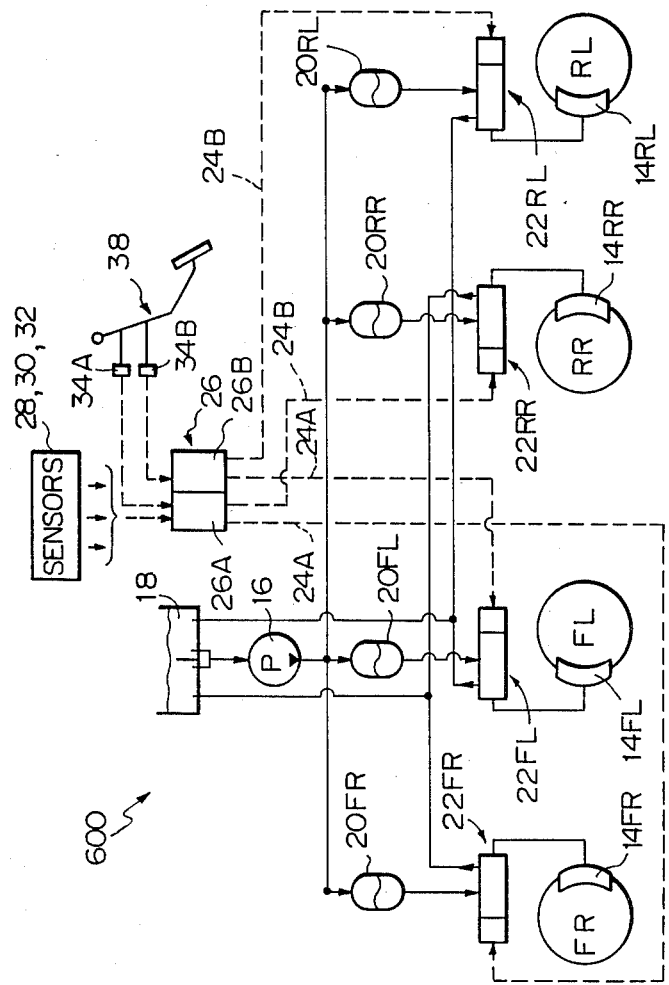
FIG. 9 is a diagrammatic view showing another layout of the braking system.

FIG. 9 shows a modified version of the braking system 10 shown in FIG. 1. The modified braking system 600 differs from the system of FIG. 1 in that the brake pedal 38 is associated with two independent pressure sensors 34A and 34B, and in that the ECU 26 comprises two independent electronic circuitries 26A and 26B. The first circuitry 26A receives the signal from the first pressure sensor 34A and controls the pressure modulators 22FR and 22RR for the front right and rear right wheels via the signal lines 24A. The second circuitry 26B receives the signal from the second pressure sensor 34B and controls the pressure modulators 22FL and 22RL for the front left and rear left wheels via the signal lines 24B. This layout provides a fail safe function in that at least two brakes are operable in the event that either of the pressure sensors 34A and 34B fails or malfunctions.

Figure 10:
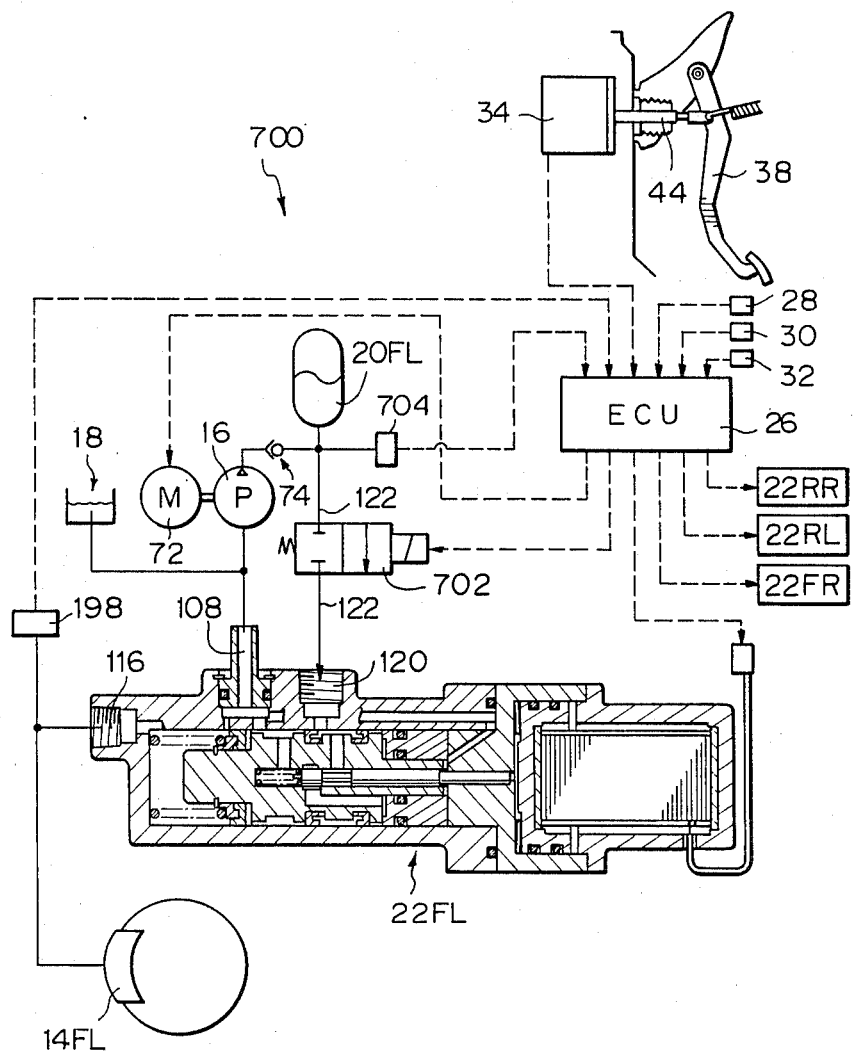
FIG. 10 is a diagrammatic view, partly in cross section, showing the layout of the braking system according to another embodiment of the invention.

FIG. 10 illustrates another layout of the braking system. Parts and members equivalent to those shown in FIG. 2 are indicated by like reference numerals. In this system 700, a solenoid-operated normally-closed shutoff valve 702 is provided across the supply line 122. The ECU 26 cooperates with a pressure sensor 704 to detect the fluid pressure at the accumulator 20FL and energizes the motor 72 to drive the pump 16 when the accumulator pressure is lower than a predetermined level. The ECU 26 also cooperates with the pedal pressure sensor 34 to energize the solenoid valve 702 and shift it into the open position whenever pressure is exerted on the brake pedal 38. With this arrangement, the high pressure fluid from the accumulator is applied to the pressure modulator 22FL only when brake application is required. Thus, during non-operation of the braking system, the pressure modulators are relieved from a high pressure fluid which would otherwise prevail at the inlet port 120 and, therefore, a problem of fluid leakage within the pressure modulators is avoided.

Figure 11:
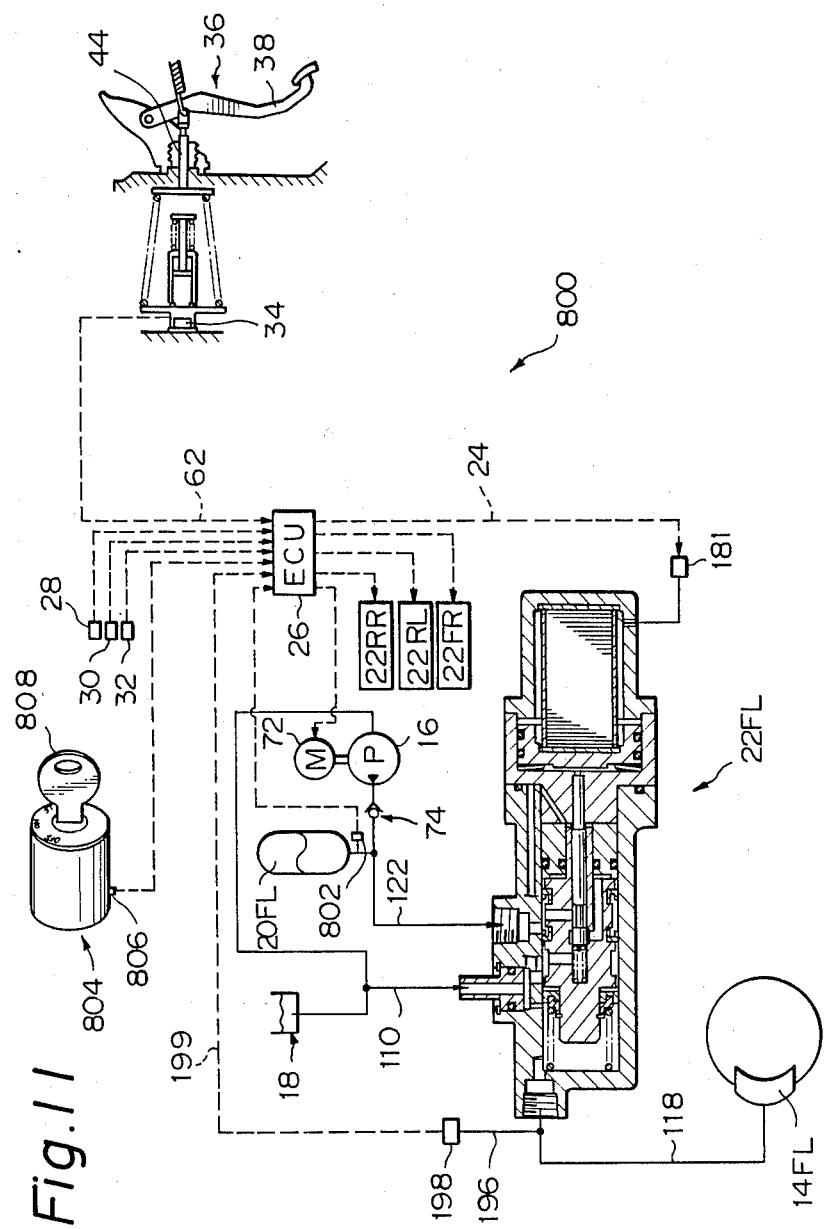
FIG. 11 is a diagrammatic view, partly in cross section, showing the layout of the braking system according to a further embodiment; and, FIGS. 12 and 13 are flow diagrams showing the operation of the electronic control unit of the braking system shown in FIG. 11.

FIG. 11 illustrates a further embodiment of the invention. Basically, the braking system 800 includes component parts shown and described with reference to FIG. 2. These are shown in FIG. 11 by like reference numerals. Additionally, the braking system 800 includes a fluid pressure sensor 802 which is adapted to detect the pressure at the accumulator 20FL and send a signal indicative of the accumulator pressure to the ECU 26. An ignition switch 804 of the vehicle is provided with a switch sensor 806 designed to issue a signal when the ignition switch 804 is turned ON by a key 808.

The operation of the braking system 800 will be described with reference to the functions of the ECU 26 shown in the flow diagrams of FIGS. 12 and 13.

Figure 12:
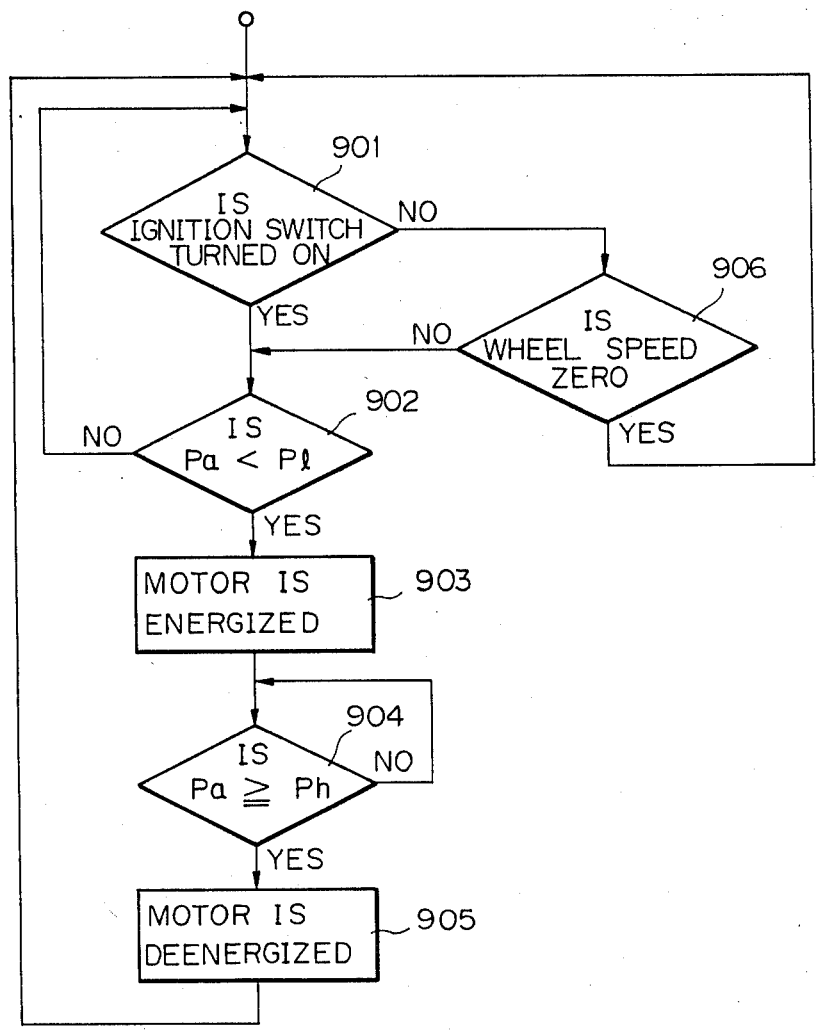

Referring to FIG. 12, at function 901, the ECU checks the signal from the switch sensor 806 to determine whether the ignition switch 804 is in the "ON" position. If so, at function 902, the ECU cooperates with the accumulator pressure sensor 802 to determine whether the accumulator pressure Pa is less than a predetermined lower limit Pl. If the accumulator pressure Pa is equal to or greater than the lower limit, function 901 is repeated. If the pressure Pa is less than the lower limit, then at function 903, the ECU energizes the electric motor 72 to drive the hydraulic pump 16. This causes the brake fluid in the reservoir 18 to be pumped into the accumulator, thereby increasing the accumulator pressure. At function 904, the ECU cooperates with the pressure sensor 802 to determine whether the accumulator pressure Pa is equal to or greater than a predetermined upper limit Ph. The ECU keeps the motor 72 energized until the pressure Pa becomes equal to or greater than the upper limit Ph, whereupon it deenergizes the motor at function 905.

If, in the determination at function 901, the ignition switch 804 is in the "OFF" position, then at function 906, the ECU cooperates with the wheel sensors 28 to determine whether the wheel speed is zero. If so, function 901 is repeated. If the wheel speed is not zero, meaning that the vehicle is running under control of the operator, then function 902 is performed.

In this manner, the motor 72 is energized to store in the accumulator a fluid pressure of a desired range required for possible brake application not only when the ignition switch is turned ON but also when the ignition switch is turned OFF and the vehicle is moving. Thus, electric power consumption of the braking system is minimized.

Figure 13:
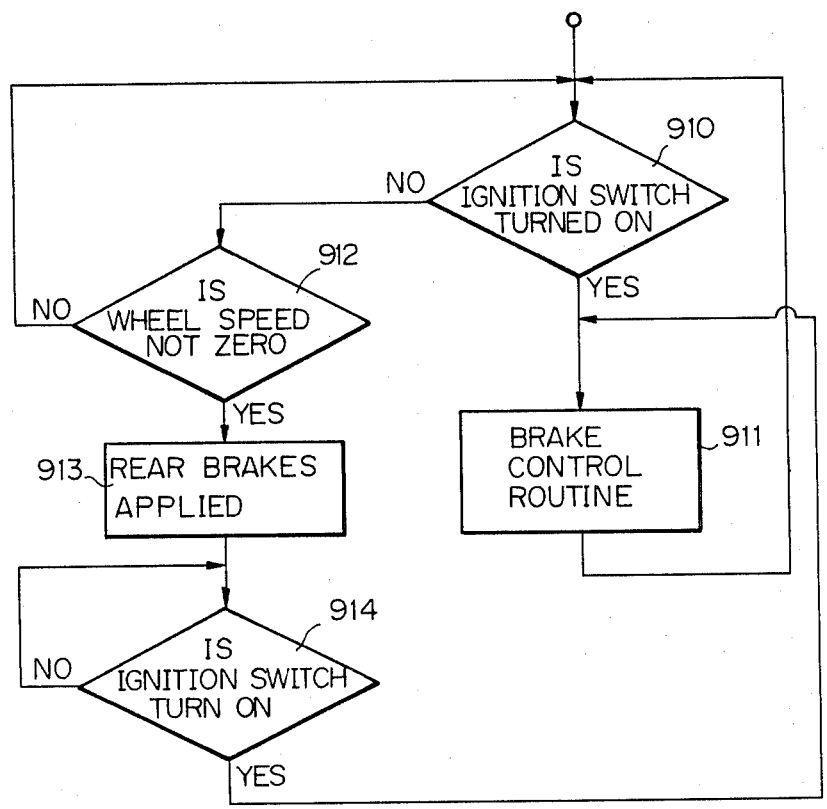

The flow diagram of FIG. 13 is intended to prevent inadvertent movement of the vehicle after parking, in addition to providing the braking operations described with reference to the flow diagram of FIG. 5. Referring to the flow diagram of FIG. 13, at function 910, the ECU 26 determines whether the ignition switch 804 is turned ON. If so, at function 911, the ECU performs the brake control routine shown and described with reference to FIG. 5 to perform various braking operations. If the ignition switch 804 is turned OFF, meaning that the vehicle is parked, then at function 912, the ECU checks the signals from the wheel sensors 28 to determine whether or not the wheel speed is zero. If the wheel speed is not zero, meaning that the vehicle is moving although the vehicle is parked, at function 913, the ECU delivers signals to the pressure modulators 22RR and 22RL for the rear wheel cylinders. This causes the pressure modulators 22RR and 22RL to communicate a fluid pressure to the rear wheel cylinders to apply the rear wheel brakes to stop the vehicle. Application of the rear brakes is continued until the ECU senses at function 914 that the ignition switch is then turned ON by the operator, whereupon the brake contol routine 911 is initiated.

In this manner, the braking system precludes movement of the vehicle after parking, due to, for example, accidental release of the parking brake, or an attempt to interfere with the vehicle.

Although the present invention has been described herein with reference to the specific embodiments thereof, it is intended that the invention is not limited thereby, and various changes and modifications may be made therein for those skilled in the art without departing from the scope of the invention.

We claim:
1. An electronically controlled braking system for a wheeled vehicle, which comprises:
 a brake operatively associated with the wheel and having a wheel cylinder for applying the brake to retard the rotation of the wheel;
 input means actuated by a vehicle operator during brake application;
 sensing means associated with said input means for sensing an amount of actuation of said input means and delivering a first electrical signal indicative of said amount;
 a source of brake fluid under pressure;
 electronic control means responsive to said first signal for delivering a second electrical signal proportional to said first signal; and
 pressure modulator means in fluid communication with said source and said wheel cylinder and responsive to said second signal for communicating to said wheel cylinder a fluid pressure proportional to said second signal to apply the brake with a braking force proportional to the amount of actuation of said input means;
 wherein said pressure modulator means comprises:
 a housing having a cylinder bore, an inlet port in fluid communication with said source, and an outlet port in fluid communication with said wheel cylinder;
 a piston received slidably and fluid-tightly in said bore to define therein an output chamber and an input chamber at opposite sides of the piston, said output chamber being in fluid communication with said outlet port, and said piston defining a passage therein for communicating said inlet port with said input chamber;
 valve means, including a valve member axially movably received in said piston, for controlling fluid communication through said passage between said inlet port and said input chamber in such a manner that fluid communication between said inlet port and said input chamber is established to allow the brake fluid under pressure to flow into said input chamber to cause the fluid pressure in said input chamber to be raised as the valve member is moved toward said output chamber, and that fluid communication between said inlet port and said input chamber is interrupted causing the fluid pressure in said input chamber to be lowered as the valve member is moved toward said input chamber; and, electrically operated positioning means responsive to said second signal and operatively associated with said valve member for positioning said valve member axially with respect to said housing, whereby the piston is moved under the action of the fluid pressure in said input chamber to a position in which fluid pressure in said output chamber is balanced with fluid pressure in said input chamber thereby communicating to said wheel cylinder a fluid pressure which is proportional to the amount of actuation of said input means.

2. A braking system according to claim 1, wherein said input means comprises a foot-operated brake pedal.

3. A braking system according to claim 2, wherein said sensing means comprises pressure sensor for sensing a pressure on said brake pedal and delivering said first signal in proportion to said pressure.

4. A braking system according to claim 2, wherein said sensing means comprises a photointerrupter operatively associated with said brake pedal for detecting an amount of travel of the pedal and issuing said first signal proportional to the amount of travel of the brake pedal.

5. A braking system according to claim 2, wherein said sensing means comprises a potentiometer operatively associated with said brake pedal for detecting an amount of travel of the brake pedal and delivering said first signal proportional to the amount of travel of the brake pedal.

6. A braking system according to claim 1, wherein said positioning means comprises a piezoelectrically expansive piezoelectric actuator operable to displace said valve member in response to said second signal.

7. A braking system according to claim 6, further comprising hydromechanical amplifier means for amplifying expansion and contraction of said piezoelectric actuator and displacing said valve member through an amount of travel which is a multiple of the amount of expansion and contraction of the piezoelectric actuator.

8. A braking system according to claim 1, wherein said positioning means comprises a solenoid operated actuator.

9. A braking system according to claim 1, further comprising means for biasing the piston toward said input chamber.

10. A braking system according to claim 1, wherein said cylinder bore and said piston are stepped to define therebetween an annular chamber communicated with said inlet port and designed to urge the piston toward said input chamber.

11. A braking system according to claim 1, wherein said source of brake fluid under pressure comprises a hydraulic pump operated by an electric motor controlled by said control means, and wherein said braking system further comprises a normally closed shut-off valve disposed between said pump and said pressure modulator means, said control means also controlling said shut-off valve to communicate said pump with said pressure modulator means when said input means is actuated.

12. An electronically controlled braking system for a wheeled vehicle having an engine ignition switch, which comprises:
(a) a brake operatively associated with the wheel and having a wheel cylinder for applying the brake to retard the rotation of the wheel;
(b) input means actuated by a vehicle operator during brake application;
(c) sensing means associated with said input means for sensing an amount of actuation of said input means and delivering a first electrical signal indicative of said amount;
(d) an accumulator for storing a brake fluid under pressure;
(e) a hydraulic pump driven by an electric motor for supplying said accumulator with the brake fluid under pressure;
(f) a pressure sensor for sensing the fluid pressure at the accumulator and delivering a second electrical signal indicative of the fluid pressure;
(g) a switch sensor for sensing the position of said ignition switch and delivering a third electrical signal when said ignition switch is closed;
(h) electronic control means responsive to said first signal for delivering a fourth electrical signal proportional to said first signal, said control means also receiving said second and third signals to detect the position of said ignition switch and the fluid pressure at said accumulator and energizing said electric motor when said ignition switch is closed and whenever said fluid pressure at said accumulator is less than a predetermined level; and,
(i) pressure modulator means in fluid communication with said accumulator and said wheel cylinder and responsive to said fourth signal for communicating to said wheel cylinder a fluid pressure proportional to said fourth signal to apply the brake with a braking force proportional to the amount of actuation of said input means, wherein said pressure modulator means comprises:
a housing having a cylinder bore, an inlet port in fluid communication with said accumulator, and an outlet port in fluid communication with said wheel cylinder;
a piston received slidably and fluid-tightly in said bore to define therein an output chamber and an input chamber at opposite sides of the piston, said output chamber being in fluid communication with said outlet port, and said piston defining a passage therein for communicating said inlet port with said input chamber;
valve means, including a valve member axially movably received in said piston, for controlling fluid communication through said passage between said inlet port and said input chamber in such a manner that fluid communication between said inlet port and said input chamber is established to allow the brake fluid under pressure into said input chamber to cause the fluid pressure in said input chamber to be raised as the valve member is moved toward said output chamber, and that fluid communication between said inlet port and said input chamber is interrupted causing the fluid pressure in said input chamber to be lowered as the valve member is moved toward said input chamber, and, electrically operated positioning means responsive to said fourth signal and operatively associated with said valve member for positioning said valve member axially with respect to said housing, whereby the piston is moved under the action of the fluid pressure in said input chamber to a position in which fluid pressure in said output chamber is balanced with fluid pressure in said input chamber thereby communicating to said wheel cylinder a fluid pressure which is proportional to the amount of actuation of said input means.

13. An electronically controlled braking system for a wheeled vehicle having an engine ignition switch, which comprises:
 (a) a brake operatively associated with the wheel and having a wheel cylinder for applying the brake to retard the rotation of the wheel;
 (b) input means actuated by a vehicle operator during brake application;
 (c) sensing means associated with said input means for sensing an amount of actuation of said input means and delivering a first electrical signal indicative of said amount.
 (d) a source of brake fluid under pressure;
 (e) a switch sensor for sensing the position of said ignition switch and delivering a second electrical signal when said ignition switch is closed;
 (f) wheel sensor means for sensing the rotation of the wheel and delivering a third electrical signal in response to rotation thereof;
 (g) electronic control means responsive to said first signal for delivering a fourth electrical signal proportional to said first signal, said control means being also responsive to said second and third signal and delivering a fifth signal upon receipt of third signal in the absence of said second signal; and,
 (h) electrically operated pressure modulator means in fluid communication with said source and said wheel cylinder and responsive to said fourth signal for communicating to said wheel cylinder a fluid pressure proportional to said fourth signal to apply the brake with a braking force proportional to the amount of actuation of said input means, said pressure modulator means being also responsive to said fifth signal to communicate to the wheel cylinder a brake fluid under pressure whereby the brake is applied when rotation of the wheel occurs while said ignition switch is opened,
wherein said pressure modulator means comprises:
 a housing having a cylinder bore, an inlet port in fluid communication with said source, and an outlet port in fluid communication with said wheel cylinder;
 a piston received slidably and fluid-tightly in said bore to define therein an output chamber and an input chamber at opposite sides of the piston, said output chamber being in fluid communication with said outlet port, and said piston defining a passage therein for communicating said inlet port with said input chamber;
 valve means, including a valve member axially movably received in said piston, for controlling fluid communication through said passage between said inlet port and said input chamber in such a manner that fluid communication between said inlet port and said input chamber is established to allow the brake fluid under pressure into said input chamber to cause the fluid pressure in said input chamber to be raised as the valve member is moved toward said output chamber, and that fluid communication between said inlet port and said input chamber is interrupted causing the fluid pressure in said input chamber to be lowered as the valve member is moved toward said input chamber, and,
 electrically operated positioning means responsive to said fourth signal and operatively associated with said valve member for positioning said valve member axially with respect to said housing, whereby the piston is moved under the action of the fluid pressure in said input chamber to a position in which fluid pressure in said output chamber is balanced with fluid pressure in said input chamber thereby communicating to said wheel cylinder a fluid pressure which is proportional to the amount of actuation of said input means.

14. An electronically controlled braking system for a wheeled vehicle, which comprises:
 (a) a brake operatively associated with the wheel and having a wheel cylinder for applying the brake to retard the rotation of the wheel;
 (b) input means actuated by a vehicle operator during brake application;
 (c) sensing means associated with said input means for sensing an amount of actuation of said input means and delivering a first electrical signal indicative of said amount;
 (d) a source of brake fluid under pressure;
 (e) wheel sensor means for sensing the rotational speed of the wheel and delivering a second signal indicative of the wheel rotational speed;
 (f) electronic control means responsive to said first signal for delivering a third electrical signal proportional to said first signal, said control means being also responsive to said second signal to detect a potential wheel skid condition and operable to reduce the magnitude of said third signal upon occurrence of the potential wheel skid condition; and,
 (g) electrically operated pressure modulator means in fluid communication with said source and said wheel cylinder and responsive to said third signal for communicating to said wheel cylinder a fluid pressure proportional to said third signal to apply the brake with a braking force proportional to the amount of actuation of said input means in the absence of the potential wheel skid condition, said pressure modulator means communicating to said wheel cylinder a reduced fluid pressure upon receiving said third signal having reduced magnitude to eliminate the potential wheel skid condition,
wherein said pressure modulator means comprises:
 a housing having a cylinder bore, an inlet port in fluid communication with said source, and an outlet port in fluid communication with said wheel cylinder;
 a piston received slidably and fluid-tightly in said bore to define therein an output chamber and an input chamber at opposite sides of the piston, said output chamber being in fluid communication with said outlet port, and said piston defining a passage therein for communicating said inlet port with said input chamber;
 valve means, including a valve member axially movably received in said piston, for controlling fluid communication through said passage between said inlet port and said input chamber in such a manner that fluid communication between said inlet port and said input chamber is established to allow the brake fluid under pressure into said input chamber to cause the fluid pressure in said input chamber to be raised as the valve member is moved toward said output chamber, and that fluid communication between said inlet port and said input chamber is interrupted causing the fluid pressure in said input chamber to be lowered as the valve member is moved toward said input chamber, and, electrically operated positioning means responsive to said third signal and operatively associated with said valve member for positioning said valve member axially with respect to said housing, whereby the piston is moved under the action of the fluid pressure in said input chamber to a position in which fluid output chamber is balanced with fluid pressure in said input chamber thereby communicating to said wheel cylinder a fluid pressure which is proportional to the amount of actuation of said input means.

15. An electronically controlled braking system for a vehicle with a driven wheel, which comprises:
(a) a brake operatively associated with the wheel and having a wheel cylinder for applying the brake to retard the rotation of the wheel;
(b) input means actuated by a vehicle operator during brake application;
(c) sensing means associated with said input means for sensing an amount of actuation of said input means and delivering a first electrical signal indicative of said amount;
(d) a source of brake fluid under pressure;
(e) wheel sensor means for sensing the rotational speed of the wheel and delivering a second signal indicative of the wheel rotational speed;
(f) electronic control means responsive to said first signal for delivering a third electrical signal proportional to said first signal, said control means being also responsive to said second signal to detect a potential wheel spin condition and delivering a fourth signal upon occurrence of the potential wheel spin condition; and,
(g) electrically operated pressure modulator means in fluid communication with said source and said wheel cylinder and responsive to said third signal for communicating to said wheel cylinder a fluid pressure proportional to said third signal to apply the brake with a braking force proportional to the amount of actuation of said input means, said pressure modulator means being also responsive to said fourth signal to communicate to the wheel cylinder the brake fluid under pressure to apply the brake to eliminate the potential wheel spin condition, wherein said pressure modulator means comprises:
a housing having a cylinder bore, an inlet port in fluid communication with said source, and an outlet port in fluid communication with said wheel cylinder;
a piston received slidably and fluid-tightly in said bore to define therein an output chamber and an input chamber at opposite sides of the piston, said output chamber being in fluid communication with said outlet port, and said piston defining a passage therein for communicating said inlet port with said input chamber;
valve means, including a valve member axially movably received in said piston, for controlling fluid communication through said passage between said inlet port and said input chamber in such a manner that fluid communication between said inlet port and said input chamber is established to allow the brake fluid under pressure into said input chamber to cause the fluid presssure in said input chamber to be raised as the valve member is moved toward said output chamber, and that fluid communication between said inlet port and said input chamber is interrupted causing the fluid pressure in said input chamber to be lowered as the valve member is moved toward said input chamber, and, electrically operated positioning means responsive to said third signal and operatively associated with said valve member for positioning said valve member axially with respect to said housing, whereby the piston is moved under the action of the fluid pressure in said input chamber to a position in which fluid pressure in said output chamber is balanced with fluid pressure in said input chamber thereby communicating to said wheel cylinder a fluid pressure which is proportional to the amount of actuation of said input means.

16. An electronically controlled braking system for a vehicle with at least two wheels, which comprises;
(a) at least two brakes operatively associated with respective wheels and each having a wheel cylinder for applying the brake to retard the rotation of the associated wheel;
(b) input means actuated by a vehicle operator during brake application;
(c) first sensing means associated with said input means for sensing an amount of actuation of said input means and delivering a first electrical signal indicative of said amount;
(d) a source of brake fluid under pressure;
(e) second sensing means associated with the vehicle for sensing a variation in potential frictional force available between the respective wheels and a road surface with which the wheels engage;
(f) at least two electrically-operated pressure modulators, provided one for each wheel cylinder, each of said pressure modulators being in fluid communication with said source and the associated wheel cylinder and operable in response to a second electrical signal to communicate to the associated wheel cylinder a fluid pressure proportional to said second signal; and,
(g) electronic control means responsive to said first signal for delivering to respective pressure modulators said second signal to cause the respective pressure modulators to communicate to the associated wheel cylinders a fluid pressure proportional to said second signal to apply the brakes with a braking force proportional to the amount of actuation of said input means in the absence of said variation in the potential frictional forces, said control means being also responsive to said second sensing means to cause said second signals to be proportioned, upon occurrence of said variation in the potential frictional forces, in such a manner as to cause the respective pressure modulators to communicate to the respective wheel cylinder a fluid pressure such that the braking forces of the respective brakes are proportional to the frictional forces on the respective wheels, wherein each said pressure modulator comprises:
a housing having a cylinder bore, an inlet port in fluid communication with said source, and an outlet port in fluid communication with said wheel cylinder;

a piston received slidably and fluid-tightly in said bore to define therein an output chamber and an input chamber at opposite sides of the piston, said output chamber being in fluid communication with said outlet port, and said piston defining a passage therein for communicating said inlet port with said input chamber;

valve means, including a valve member axially movably received in said piston, for controlling fluid communication through said passage between said inlet port and said input chamber in such a manner that fluid communication between said inlet port and said input chamber is established to allow the brake fluid under pressure into said input chamber to cause the fluid pressure in said input chamber to be raised as the valve member is moved toward said output chamber, and that fluid communication between said inlet port and said input chamber is interrupted causing the fluid pressure in said input chamber to be lowered as the valve member is moved toward said input chamber, and, electrically operated positioning means responsive to said second signal and operatively associated with said valve member for positioning said valve member axially with respect to said housing, whereby the piston is moved under the action of the fluid pressure in said input chamber to a position in which fluid pressure in said output chamber is balanced with fluid pressure in said input chamber thereby communicating to said wheel cylinder a fluid pressure which is proportional to the amount of actuation of said input means.

* * * * *